(12) United States Patent
Wasz

(10) Patent No.: US 11,831,044 B2
(45) Date of Patent: Nov. 28, 2023

(54) HEAT-AUGMENTED PRIMARY BATTERY

(71) Applicant: The Aerospace Corporation, El Segundo, CA (US)

(72) Inventor: Margot Wasz, El Segundo, CA (US)

(73) Assignee: The Aerospace Corporation, El Segundo, CA (US)

( * ) Notice: Subject to any disclaimer, the term of this patent is extended or adjusted under 35 U.S.C. 154(b) by 309 days.

(21) Appl. No.: 16/937,787

(22) Filed: Jul. 24, 2020

(65) Prior Publication Data

US 2022/0029174 A1 Jan. 27, 2022

(51) Int. Cl.
*H01M 6/50* (2006.01)

(52) U.S. Cl.
CPC .................. *H01M 6/5038* (2013.01)

(58) Field of Classification Search
None
See application file for complete search history.

(56) References Cited

U.S. PATENT DOCUMENTS

2003/0194602 A1* 10/2003 Daoud ............... H01M 50/138
429/188
2017/0149103 A1* 5/2017 Yang ................. H01M 10/6556

OTHER PUBLICATIONS

Department of the Navy, Washington, DC, "Navy Primary and Secondary Batteries: Design and Manufacturing Guidelines", Sep. 1991.
Krause, Frederick, et al., "High Specific Energy Lithium Primary Batteries as Power Sources for Deep Space Exploration," Journal of the Electrochemical Society, 165 (10) A2312-A2320 (2018).

* cited by examiner

*Primary Examiner* — Carmen V Lyles-Irving
(74) *Attorney, Agent, or Firm* — LeonardPatel PC

(57) ABSTRACT

An apparatus may include a plurality of cells surrounded by a plurality of heat generating material. The plurality of heat generating material are configured to release heat to each of the plurality of cells causing discharge from each of the plurality of cells in a low temperature environment.

10 Claims, 3 Drawing Sheets

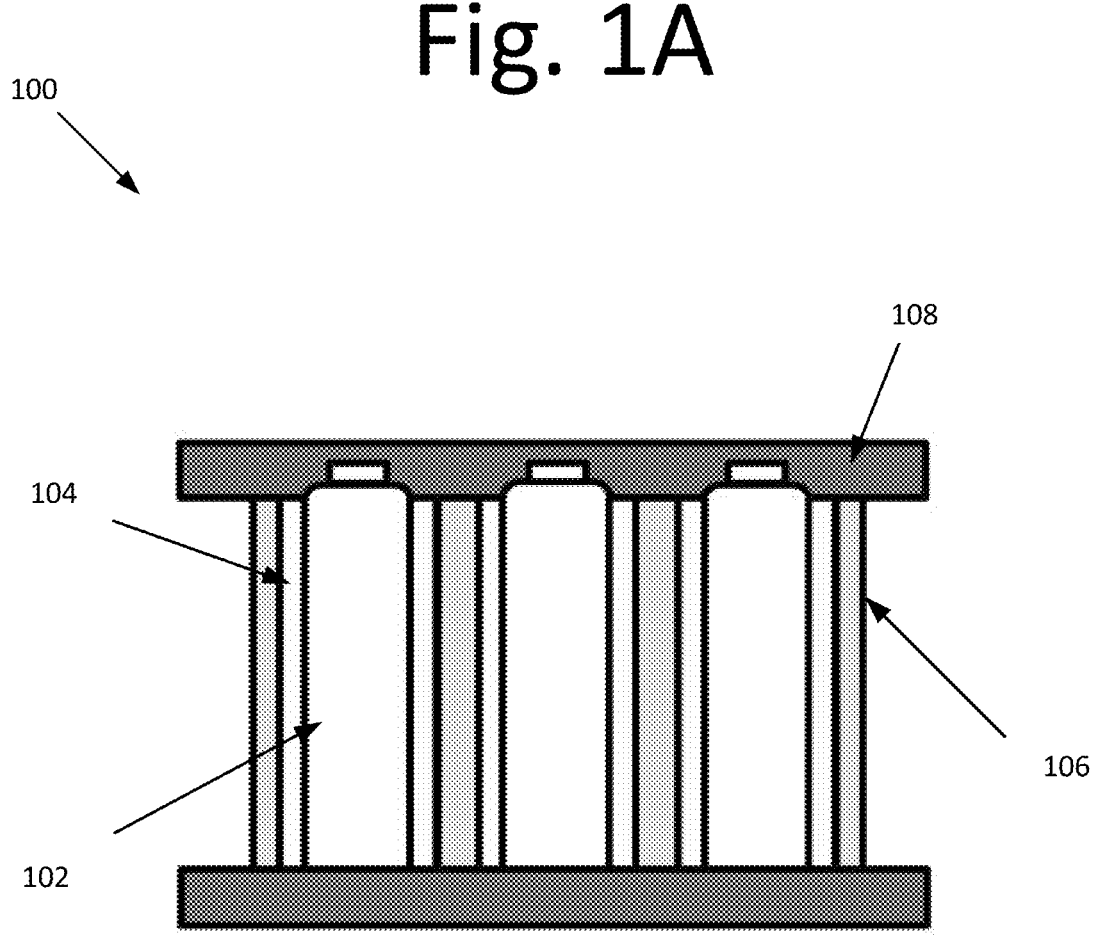

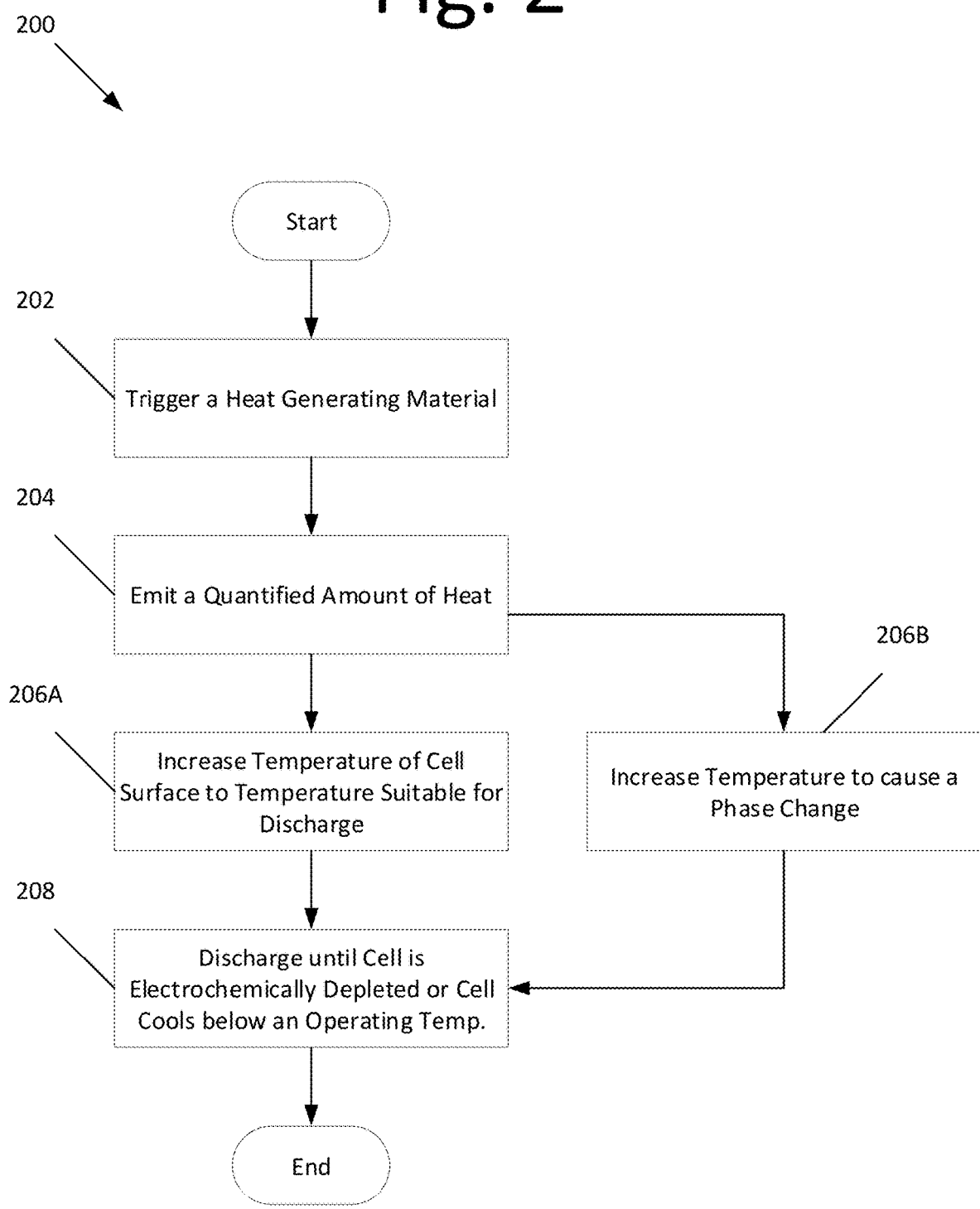

HEAT-AUGMENTED PRIMARY BATTERY

FIELD

The present invention relates to batteries, and more particularly, to improving low temperature discharge capability of primary batteries in space.

BACKGROUND

Recently, Jet Propulsion Laboratory® (JPL) surveyed a number of candidate primary battery cell chemistries for use in exploration missions to the outer planets. The goal was to provide electrical power for la Europa lander where operation between −40° C. and 0° C. was needed. Of the chemistries studied, only Li—CFx met requirements for high energy density, measuring 640 Wh/kg at 0° C.

Unfortunately, this chemistry failed to discharge at all at −40° C. due to slow kinetics, the high activation energy for breaking the C—F bond, and surface passivation. The energy density of a Li—CFx cell design from Rayovac®, found to be 508 Wh/kg under a medium rate discharge at 0° C., fell to zero under same rate at −40° C. due to these effects.

Chemically-generated heat is used to activate discharge of a type of batteries called thermal reserve batteries. Thermal reserve batteries are used in applications, such as munitions, where a long shelf life is required, and it is imperative that the electrodes do not self-discharge. To achieve this, the electrolyte in these batteries is a non-conductive, inert, solid at room temperature. When the battery is needed, heat is applied to melt the electrolyte by means of igniting thermite-type materials within the cell stack and heat pellets surrounding the electrodes. Typically, these batteries operate upwards of 350° C., maintaining discharge from seconds to a long as an hour depending on the thermal design, the amount of heating and active materials present, and the electrical load placed on the battery.

Thermal buffers are used in systems that are intolerant of high temperature transients. Phase change materials are effective thermal buffers because they maintain a characteristic isotherm until all of the material has changed phase.

However, an improved heat augmented battery system is needed.

SUMMARY

Certain embodiments of the present invention may provide solutions to the problems and needs in the art that have not yet been fully identified, appreciated, or solved by current battery technologies. For example, some embodiments of the present invention pertain to low temperature discharge capability of primary batteries in space.

In an embodiment, an apparatus may include a plurality of cells surrounded by a plurality of heat generating material. The plurality of heat generating material are configured to release heat to each of the plurality of cells causing discharge from each of the plurality of cells in a low temperature environment.

In another embodiment, an apparatus may include heat generating material configured to heat primary batteries from a first temperature to a second temperature. The second temperature may be higher than ambient temperature. The apparatus may also include phase change material configured to absorb heat produced from the heat generating material while maintaining a benign temperature at a surface of the primary batteries.

In yet another embodiment, an apparatus includes phase change material placed between heat generating material and primary batteries. The phase change material is configured to absorb heat produced from the heat generating material while maintaining a benign temperature at a surface of the primary batteries. The heat generating material is configured to heat primary batteries from a first temperature to a second temperature. The second temperature being higher than ambient temperature. The primary batteries are configured to discharge until the heat from the heating generating material dissipates or temperature of the primary batteries cools below an operating temperature.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 1A and 1B are schematic diagrams illustrating a plurality of cells and the materials surrounding each cell, according to an embodiment of the present invention.

FIG. 2 is a flow diagram illustrating a method for improving the low temperature discharge capability of primary batteries, according to an embodiment of the present invention.

DETAILED DESCRIPTION OF THE EMBODIMENTS

Figure 1B:
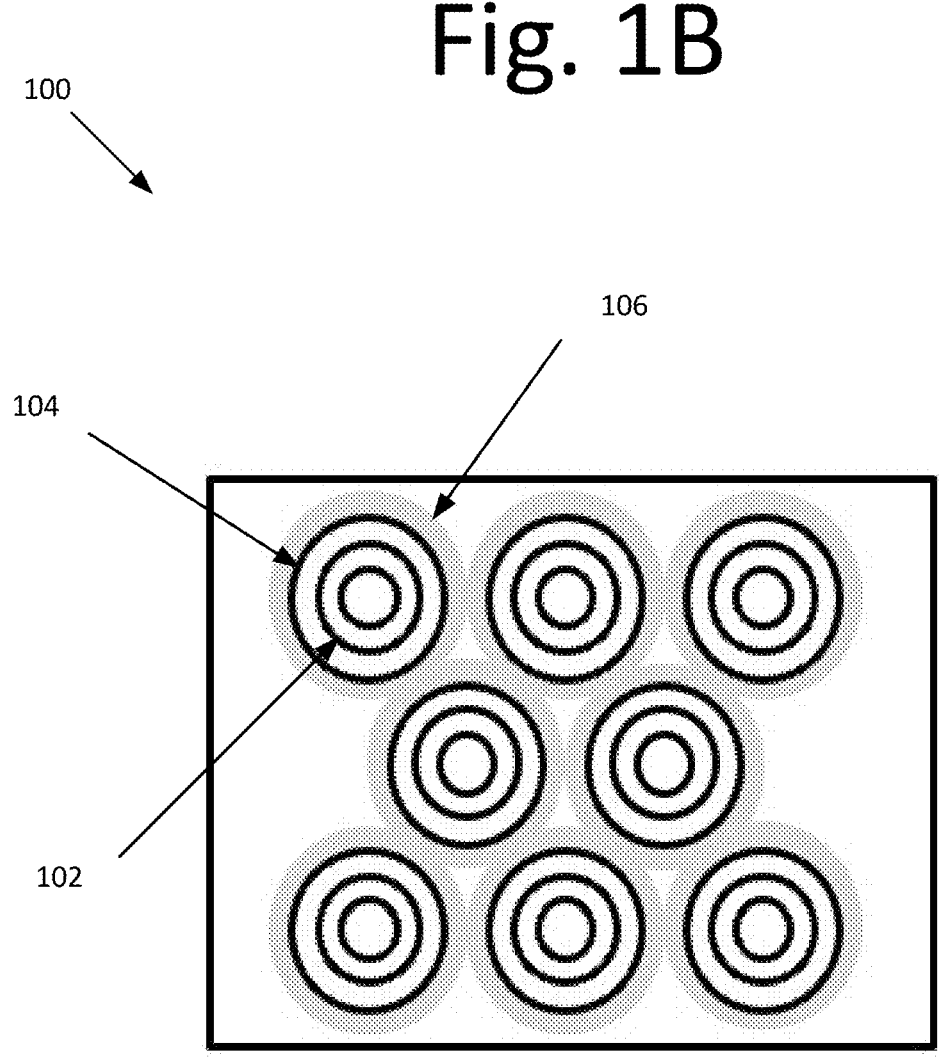

Some embodiments generally pertain to improving the low temperature discharge capability of primary batteries. For example, heat-generating materials typically employed in reserve thermal batteries are used to heat primary batteries from very low temperatures to temperatures significantly higher than ambient temperature for efficient battery operation. Ambient temperature for some embodiments is defined as room temperature or temperatures in the range of 15-30° C. In some additional embodiments, phase change thermal buffers are added to protect the batteries (or cells) against high thermal transients. For example, when the temperature produced by the heat-generating material is prohibitive for the safe operation of the cell, the phase change material absorbs the heat produced while maintaining a benign temperature at the surface of the cell.

Primary (e.g., non-rechargeable) batteries, such as Li—CFx, do not operate well at temperatures less than −10° C. at moderate discharge rates, and their use in space is limited due to the need to operate at these temperatures and lower. For example, start-up voltage delays are more pronounced, operating voltages are lower, and the total amount of capacity that can be discharged is reduced as temperature is decreased, an effect that is magnified at moderate discharge rates or higher.

Some embodiments allow these high energy density primary (e.g., non-rechargeable) battery types, such as Li-CFx, to operate at very cold temperatures so that they could be used for deep space applications.

Additionally, some embodiments use heat generating material, such as those used in a thermal reserve battery, to heat the primary batteries, improving low temperature capability. For example, heat generating material includes pyrotechnic heat sources such as thermites and heat pellets.

FIGS. 1A and 1B are schematic diagrams 100 illustrating a plurality of cells 102 and the materials surrounding each cell 102, according to an embodiment of the present invention. In some embodiments, each cell 102 is enveloped or surrounded by phase change material (or alloy) 104 and then further surrounded by heat generating material (or heat compound) 106 to absorb the heat produced while maintaining a benign temperature at the surface of cell 102.

During operation, heat generating material 106 may be triggered to react when discharge of a primary battery is needed in a low temperature environment. A low temperature environment is defined as a temperature less than the design point of cell 102 where the discharge performance is degraded due to slower kinetics, slower chemical reaction rates, and/or lower conductivities. In some embodiments, heat generating material 106 is triggered by a fuse initiated by an electric ignitor, squib, or by laser.

Triggering may cause heat to be released towards cells 102, allowing cells 102 to commence discharge. The amount of heat released by the chemicals need only be sufficient to raise the temperature of cells 102 to a nominal discharge temperature for a short period of time. For example, short period of time is considered to be the amount of time needed until the heat of cell 102 discharge reaction is sufficient to maintain cell 102 at the higher temperature. It should be appreciated that the amount of time until this occurs is application dependent and relies on cell 102 discharge rate. Thereafter, cells 102 may continue discharge until cells 102 are depleted by the electrical discharge reaction. In some embodiments, cells 102 continue discharge until the heat provided by heat generating material 106 has dissipated for example by conduction or radiation.

Phase change material 104 (e.g., thermal buffers) may be used between the heat generating material 106 and cells 102, and are configured to protect certain primary battery types, such as those containing metallic lithium anodes, from high temperature transients. High temperature transients may be temperatures higher than the primary batteries design point causing undesirable chemical reactions, material phase changes, or damage to contents of the primary batteries.

The temperature of phase change material 104 may be selected to optimize the discharge capability of the type of primary battery that is chosen. For example, a phase change material, such as a paraffin wax, can be selected with a melting point close to the temperature for optimum cell discharge capacity and act as a thermal buffer against the higher temperatures produced by the heat generating material.

Some embodiments may provide for a design strategy that is a one-time use of a primary battery at temperatures significantly below their normal use. It would be used in those applications where the batteries are only used to provide power for one-time events, e.g., deployment of planetary lander vehicles.

FIG. 2 is a flow diagram illustrating a method 200 for improving the low temperature discharge capability of primary batteries, according to an embodiment of the present invention. In some embodiments, method 200 may begin at 202 with triggering a heat generating material by an electric current or laser initiator. At 204, the heat generating material emits a quantified amount of heat tuned to an application. For example, a cell, which provides a high current once discharge commences, generates more heat due to self-heating and needs less heat generating material to maintain minimum temperatures during operation.

At 206A, when phase change material is not used, the heat released by the heat generating material increases the temperature of the cell surface to a temperature suitable for discharge. Alternatively, at 206B, when phase change material is used, the heat causes a phase change, such as melting, forcing the cell surface to attain a temperature suitable for discharge. At 208, the cell commences discharge and generates additional heat, and continues to discharge until the cell is electrochemically depleted. In some further embodiments, discharge continues until the heat conduction out of the system due to thermal conduction and radiation are no longer able to maintain the cell at a temperature sufficient enough or high enough for discharge.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
   heat generating material configured to heat primary batteries from a first temperature to a second temperature, the second temperature being higher than ambient temperature; and
   phase change material configured to absorb heat produced from the heat generating material while maintaining a benign temperature at a surface of the primary batteries, wherein
   the phase change material circumferentially surrounds and abuts the primary batteries, and the heat generating material circumferentially surrounds the phase change material absorbing the heat produced while maintaining the benign temperature at the surface of the primary batteries.

2. The apparatus of claim 1, wherein the heat generating material comprises a pyrotechnic heat source to generate heat.

3. The apparatus of claim 1, wherein the phase change material between the heat generating material and the primary batteries are configured to protect the primary batteries from high temperature transients,
   the high temperature transients being temperatures higher than the primary batteries design point causing undesirable chemical reactions, material phase changes, or damage to contents of the primary batteries.

4. The apparatus of claim 1, wherein the heat generating material is triggered to react when discharge of the primary batteries is required in a low temperature environment, and
   the low temperature environment is a temperature being less than a design point of the primary batteries where the discharge performance is degraded due to slower kinetics, slower chemical reaction rates, and/or lower conductivities.

5. The apparatus of claim 4, wherein the heat generating material is triggered by a fuse initiated by an electric ignitor, squib, or by laser.

6. The apparatus of claim 4, wherein, when the heat generating material is triggered, the heat generating material is configured to release the heat towards the primary batteries, allowing the primary batteries to commence discharge in the low temperature environment.

7. The apparatus of claim 4, wherein, when the heat generating material is triggered, the primary batteries are configured to discharge until the heat from the heating generating material dissipates or the primary batteries temperature cools below an operating temperature.

8. An apparatus, comprising:
   phase change material placed between heat generating material and primary batteries, wherein
   the phase change material is configured to absorb heat produced from the heat generating material while maintaining a benign temperature at a surface of the primary batteries,
   the heat generating material is configured to heat primary batteries from a first temperature to a second temperature, the second temperature being higher than ambient temperature,
   the primary batteries are configured to discharge until the heat from the heating generating material dissipates or temperature of the primary batteries cools below an operating temperature, and
   the phase change material circumferentially surrounds and abuts the primary batteries, and the heat generating material circumferentially surrounds the phase change material absorbing the heat produced while maintaining the benign temperature at the surface of the primary batteries.

9. The apparatus of claim 8, wherein the heat generating material is triggered to react when discharge of the primary batteries is required in a low temperature environment.

10. The apparatus of claim 9, wherein, when the heat generating material is triggered, the heat generating material is configured to release the heat towards the primary batteries, allowing the primary batteries to commence discharge in the low temperature environment.

* * * * *